United States Patent [19]
Fork

[11] Patent Number: 6,042,013
[45] Date of Patent: *Mar. 28, 2000

[54] MULTI-COLORED ILLUMINATOR APPARATUS FOR A SCANNER DEVICE

[75] Inventor: David Kirtland Fork, Los Altos, Calif.

[73] Assignee: Xerox Corporation, Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/972,043

[22] Filed: Nov. 17, 1997

[51] Int. Cl.$^7$ ..................................................... G06K 7/12
[52] U.S. Cl. ......................... 235/469; 382/324; 358/514
[58] Field of Search ..................................... 235/469, 435, 235/439, 447, 454, 455, 462.04, 462.45; 382/162, 321, 324; 358/509, 513, 514

[56] References Cited

U.S. PATENT DOCUMENTS

| | | | |
|---|---|---|---|
| 4,378,567 | 3/1983 | Mir ............................................. | 358/75 |
| 4,558,357 | 12/1985 | Nakagawa et al. ...................... | 358/509 |
| 4,605,956 | 8/1986 | Cok ........................................... | 358/44 |
| 4,703,186 | 10/1987 | Nakama et al. ..................... | 235/472 X |
| 4,736,251 | 4/1988 | Sasaoka ..................................... | 358/75 |
| 5,055,921 | 10/1991 | Usui ........................................... | 358/44 |
| 5,361,145 | 11/1994 | Hasegawa ................................ | 358/514 |
| 5,408,084 | 4/1995 | Brandorff et al. ....................... | 358/472 |
| 5,468,950 | 11/1995 | Hanson ................................ | 235/469 X |
| 5,532,467 | 7/1996 | Roustaei ............................. | 235/455 X |
| 5,619,029 | 4/1997 | Roxby et al. ............................ | 235/469 |
| 5,675,425 | 10/1997 | Imoto et al. ............................ | 358/513 |
| 5,729,361 | 3/1998 | Suggs et al. ............................. | 358/509 |
| 5,898,510 | 4/1999 | Kaihotsu et al. ....................... | 358/509 |

FOREIGN PATENT DOCUMENTS

| | | |
|---|---|---|
| 660616 A2 | 12/1993 | European Pat. Off. . |
| 7214819 | 2/1994 | Japan . |
| 09130546 | 11/1995 | Japan . |

OTHER PUBLICATIONS

"A Contact–Type Full–Color Reading System Using Three–Color Solid State Illuminators", by Kazumi Komiya & Narinobu Satoh, Dept. of Electronic & Electrical Engineering, Kanagawa Institute of Technology, Kanagawa, Japan, SPIE vol. 2415, pp. 164–170, missing month & year Feb. 27, 1998.

"TDI Charge–Coupled Devices: Design and Applications", by H.S. Wong, Y.L. Yao & E.S. Schlig, IBM J. Res. Develop., vol. 36, No. 1, Jan. 1992, pp. 83–85.

"A Trilinear, 32 Stage, Selectable TDI CCD Image Sensor for High Resolution Colour Scanning Applicaitions", by Suhail Agwani, Dave Dobson, William Washkurak & Savvas Chamberlain, Dalsa Inc., Waterloo, Ontario, Canada, SPIE vol. 2172, pp. 124–132, missing month & year Feb. 1994.

*Primary Examiner*—Donald Hajec
*Assistant Examiner*—Diane I. Lee
*Attorney, Agent, or Firm*—Oliff & Berridge, PLC

[57] ABSTRACT

An illuminator apparatus for a scanner device includes a support structure that extends along the longitudinal axis and an array of light emitting elements that are disposed on and supported by the support structure. The array of light emitting elements are arranged on the support structure in at least three longitudinal rows. The at least three rows of light emitting elements are associated with a respective one of blue, green and red colored light emitting elements. A color image sensor apparatus for a scanner device capable of scanning a multi-colored document and a method for illuminating a colored document being scanned in a scanning device are also described.

24 Claims, 5 Drawing Sheets

MULTI-COLORED ILLUMINATOR APPARATUS FOR A SCANNER DEVICE

BACKGROUND OF THE INVENTION

1. Field of Invention

This invention relates to an illuminator apparatus usable with a scanner device, such as a document scanner or a facsimile machine. More particularly, this invention is directed to a multi-colored illuminator apparatus usable with a scanner device capable of scanning multi-colored documents.

2. Description of Related Art

Conventional scanners allow a computer to convert text, a drawing or a photograph into digital information so that a graphics or desktop publishing program can use the digital information to display the image of the text, drawing or photograph onto a display screen or to reproduce the image with a graphics printer. Some conventional scanners distinguish between only black and white colors which can be useful for text or line art. More sophisticated scanners can differentiate between shades of gray. Even more sophisticated scanners can differentiate among colors and use red, blue and green filters to detect the colors in the reflected light.

Many conventional scanners use either fluorescent or incandescent illuminators to illuminate the text, drawing or photograph during scanning. Fluorescent or incandescent illumination is adequate for black and white scanners, as well as for those scanners that can differentiate shades of gray. Black-and-white and gray-shading scanning requires only one pass of a scan head in a slow scanning direction adjacent the scanned document. For a conventional multi-pass color scanner, the document is scanned multiple times, and each time the illumination on the document is filtered to pass a different color region of the light onto the document and, in turn, onto the image sensing detectors. For a conventional single-pass color scanner, the red, green and blue image sensing pixels in the image sensing detector use red, green and blue color filters. In conventional multi-pass and single-pass scanners, the filters discard on average more than two-thirds of the light reaching the pixel, lowering the overall illumination efficiency of the system.

Instead of fluorescent or incandescent illuminators, one manufacturer uses an illuminator that includes a single row of red, green and blue diodes as the light source. As stated above, scanning is achieved using a multi-pass scanner or a single-pass scanner.

Regardless of the type of illuminator used in the conventional scanner devices, the document is illuminated with white light, i.e., the various spectral regions corresponding to red, green and blue which are intermixed at the source of the illumination. The light is reflected off the document and imaged onto light-sensitive detectors. These detectors are often referred to as photodiode arrays or "charge coupled devices" or "CCDs". Using only a single line of white light across the document being scanned results in a rather inefficient use of the color components of the light.

SUMMARY OF THE INVENTION

This invention provides an illuminator apparatus for a scanner device that illuminates spatially-separated blue, green and red colored light simultaneously onto a document to be scanned.

This invention also provides an illuminator apparatus particularly suitable for scanning a multi-colored document.

This invention further provides an illuminator apparatus for scanning multi-colored documents by using only a single pass of the scan head in a slow scan direction.

This invention additionally provides an illuminator apparatus for scanning a multi-colored document at a scanning speed faster than conventional color document scanning.

Providing an illuminator capable of illuminating spatially-separated blue, green and red light onto a multi-colored document simultaneously during the scanning process is advantageous because color filters may be eliminated. The scanning system using the illuminator apparatus of this invention can achieve substantially more efficient utilization of the light produced by the illuminator, and thereby operate at lower power, higher scan speed or both in comparison to conventional scanning systems.

In its broadest form, the illuminator apparatus includes a support structure that extends along a longitudinal axis and an array of light emitting elements which are disposed on and supported by the support structure. The array of light emitting elements are arranged on the support structure in a plurality of longitudinally extending rows disposed apart from each other in a slow scan direction. Each row emits a different spectral distribution of light, compared with the adjacent rows of light emitting elements. Preferably, the illuminator apparatus of this invention includes three rows of light emitting elements with respective ones of the three rows having blue, green and red light emitting elements.

BRIEF DESCRIPTION OF THE DRAWINGS

These and other objects of the present invention will be readily appreciated and understood from consideration of the following detailed description of embodiments of the present invention when taken together with the accompanying drawings, in which.

DETAILED DESCRIPTION OF PREFERRED EMBODIMENTS

Figure 1:
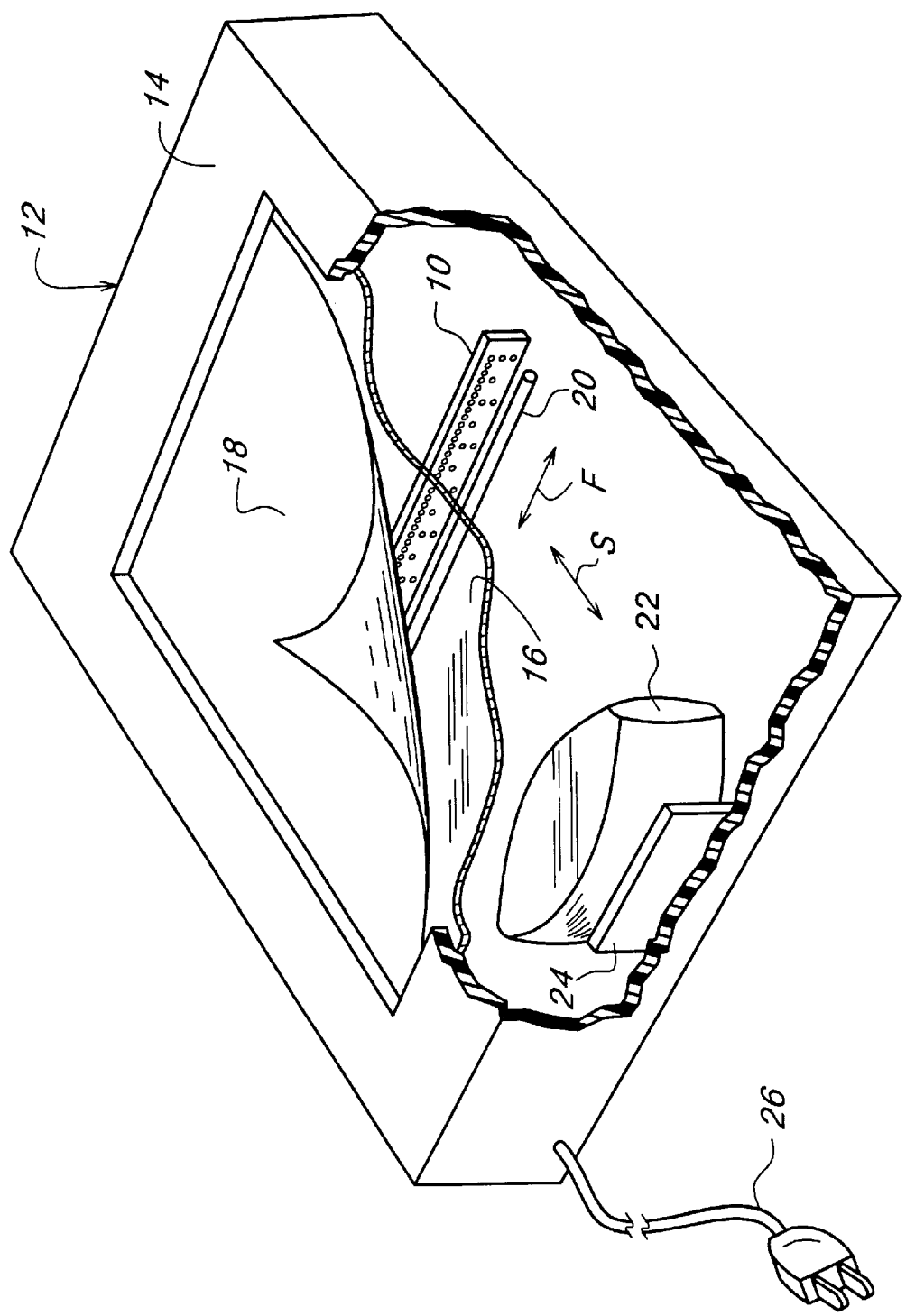
FIG. 1 is a perspective view, partially broken away, of a scanner device incorporating a first of an illuminator apparatus of this invention.

As illustrated in FIG. 1, a first embodiment of an illuminator apparatus 10 of this invention is used with a scanner device 12. One of ordinary skill in the art should appreciate that the scanner device 12 is a flatbed scanner and is used by way of example only. Other types of scanners usable with this invention include sheet-fed scanners, such as a facsimile machine, and a hand-held scanner. Furthermore, a skilled artisan should appreciate that the scanner device 12 is used for illustrative purposes only and that other components commonly known in the industry required for proper scanning operations are not shown.

In FIG. 1, the scanner device 12 includes a housing 14 having a transparent plate 16 extending along a top portion of the housing 14. The transparent plate 16 supports a document 18 to be scanned. The document 18 can be text, a drawing, a photograph or the like. Additionally, the document 18 can be either a black and white document or a multi-colored document. Although it is not so limited, the illuminator apparatus 10 of this invention is particularly usable in scanning multi-colored documents.

Internally, the scanner device 12 includes the illuminator apparatus 10, a rod lens 20, a convex lens 22 and a light sensitive detector 24. For the flatbed scanner device 12 shown in FIG. 1, the illuminator apparatus 10 and the rod lens 20 are incorporated into a scan head (not shown) that moves in a slow scanning direction indicated by arrow S. One of ordinary skill in the art would appreciate that the scanning operation also occurs in a fast scanning direction indicated by arrow F. A conventional electric cord 26 carries electrical power to the scanner device 12 for performing scanning operations.

Figure 2:
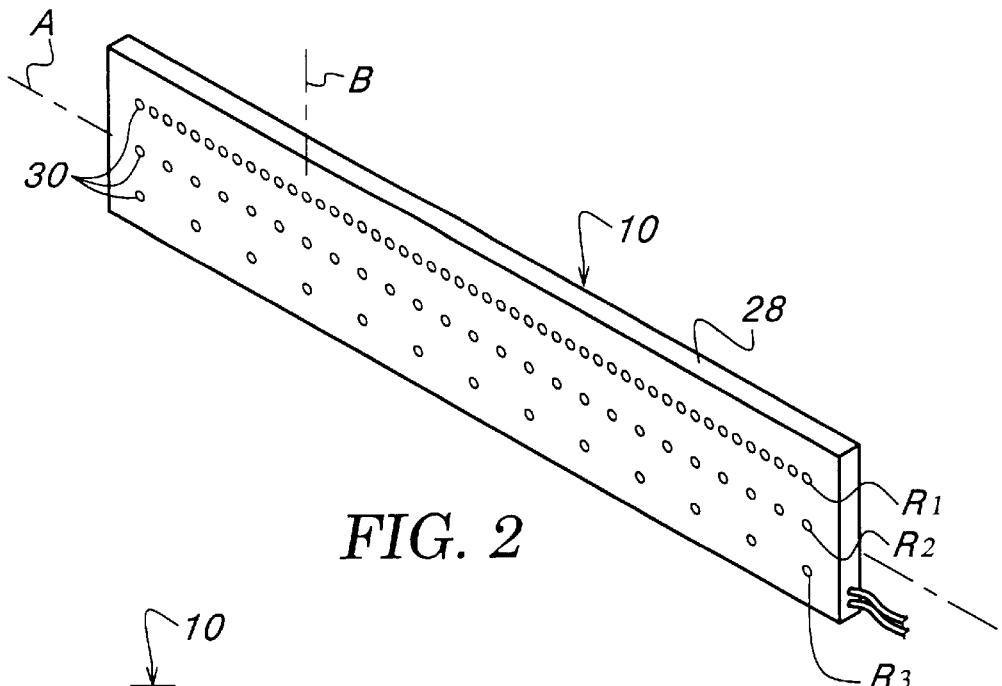
FIG. 2 is a perspective view of the first embodiment of the illuminator apparatus.
Figure 3:
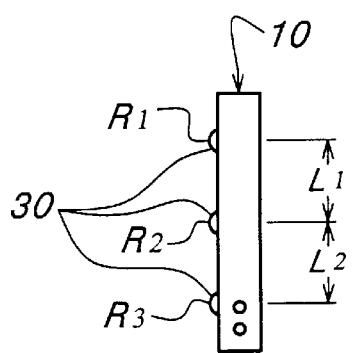
FIG. 3 is a side elevational view of the first embodiment of the illuminator apparatus.
Figure 4:
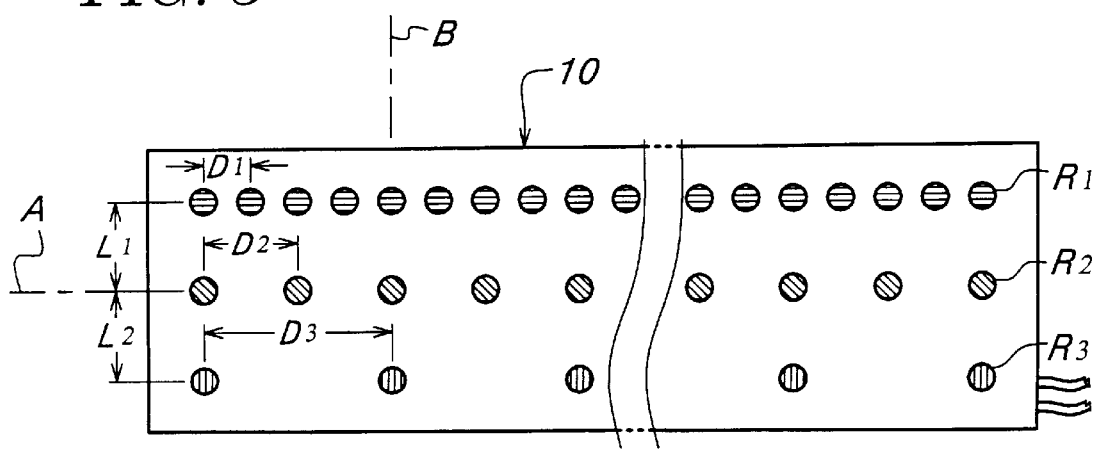
FIG. 4 is an enlarged front elevational view of the first embodiment of the illuminator apparatus.

With reference to FIGS. 2–4, the first embodiment of the illuminator apparatus 10 includes a support structure 28 and an array of light emitting elements 30 which are disposed on and supported by the support structure 28. The support structure 28 is fabricated from a stiff yet resilient material and is typically a printed circuit board supported by metal or plastic. The support structure 28 extends along a longitudinal axis A. The array of light emitting elements 30 is arranged on the support structure 28 in a plurality of a longitudinally extending rows shown as a first row $R_1$, a second row $R_2$ and a third row $R_3$. The rows $R_1$–$R_3$ of light emitting elements 30 are disposed apart from each other in a direction B which extends perpendicularly to the longitudinal axis A. Each row $R_1$, $R_2$ and $R_3$ includes a plurality of the light emitting elements 30. Preferably, the light emitting elements 30 are light emitting diodes. As shown in FIGS. 2–4, 7 and 8, each light emitting element 30 is represented in a circular or rounded configuration. However, a skilled artisan would appreciate that such light emitting elements could also be represented in a square or rectangular configuration.

In the first embodiment of the illuminator apparatus 10, the array of light emitting elements 30 includes three substantially parallel rows of light emitting elements 30. Preferably, each row of the light emitting elements is a different color. As best shown in FIG. 4, the first row $R_1$ is an outer row of blue colored emitting elements and the third row $R_3$ is a second outer row of light emitting elements which are colored red. The row $R_2$ is an intermediate row of green colored light emitting elements and is disposed between the first outer row $R_1$ of the blue colored light emitting elements and the second outer row $R_3$ of the red colored emitting elements.

Consecutive ones of the rows, $R_1$, $R_2$ and $R_3$ of the colored light emitting elements, are disposed apart from each other at a lateral distance. Specifically, the first outer row $R_1$ of the blue colored light emitting element is disposed apart from the intermediate row $R_2$ of the green colored light emitting element at a first lateral distance $L_1$, as best shown in FIG. 4. Further, the second outer row $R_3$ of the red colored light emitting elements is disposed apart from the intermediate row $R_2$ of the green colored light emitting elements at a second lateral distance $L_2$. In the first embodiment of the illuminator apparatus 10, the first lateral distance $L_1$ is less than the second lateral distance $L_2$.

Also, as best illustrated in FIG. 4, adjacent ones of the colored light emitting elements 30 in the respective rows $R_1$, $R_2$ and $R_3$ are spaced apart from one another at respective distances. Particularly, adjacent ones of the blue colored light emitting elements 30 are spaced apart from one another at a first distance $D_1$. Adjacent ones of the green colored light emitting elements 30 are spaced apart from one another at a second distance $D_2$. Adjacent ones of the red colored light emitting elements 30 are spaced apart from one another at a third distance $D_3$. As shown in FIG. 4, the third distance $D_3$ between the adjacent red colored light emitting elements 30 is greater than the second distance $D_2$ between the adjacent green colored light emitting elements 30. Also, the second distance $D_2$ between the green colored light emitting elements 30 is greater than the first distance $D_1$ between the adjacent blue colored light emitting elements 30.

The spacings $D_1$, $D_2$ and $D_3$ between the light emitting elements within each row are determined by the imaging requirements for each color channel in the image sensing detector. To achieve a larger irradiance on the image sensor surface, the light emitting elements can be spaced more closely together.

For example, the LED bar scenario considered in Table I below pertains to a possible 60 page-per-minute scanner using a TDI image sensing detector as the light-sensitive detector. When the various factors such as the F-numbers of the lens, the demagnification of the imager and the sensitivities of the red, blue and green channels are taken into account, the required irradiance on the document is 5.14 mW/cm$^2$, 12.93 mW/cm$^2$ and 16.70 mW/cm$^2$ for red, green and blue respectively. It is assumed that the relay lens collects 50% of the light generated by the light emitting diodes, and places 70% of the collected light into rows imaged onto the TDI sensor. The resulting density of light emitting diodes required on the LED bar are approximately 1, 2.5 and 4 light emitting diodes per inch for red, green and blue light emitting diodes respectively. The spacing of the light emitting diodes also depends on their operating efficiency. The blue and green light emitting diode efficiencies are taken from an article by S. Nakamura et al. in Jpn. J. Appl. Phys. 34, L1332 (1995). Commercially available monochrome red LED bars have diode densities as high as 10 diodes per inch, indicating considerable design latitude for this scenario. The higher density of blue light emitting diodes reflects the fact that the sensitivity of the TDI image sensing detector is poorest for blue light.

TABLE I

|  | Red | Green | Blue | (Units) |
|---|---|---|---|---|
| Diode Characteristics | | | | |
| Diode Size | 250 | 250 | 250 | um |
| Output Power | 3 | 3 | 5 | mW |
| Input Current | 20 | 20 | 20 | mA |
| Efficiency | 6% | 6% | 9% | |
| Center Wavelength | 660 | 525 | 450 | nm |
| TDI | | | | |
| Scan Speed | 60 | | | spm |
| Page Width | 12.5 | | | in |
| Spacing | 18 | | | pixels |
| Resolution | 400 | 400 | 400 | spi |
| Stages | 12 | 12 | 27 | |
| Collection Efficiency | 50% | 50% | 50% | |
| Image Overlap | 70% | 70% | 70% | |
| Spacing | 1.143 | 1.143 | 1.143 | mm |
| Image Height | 0.762 | 0.76 | 1.71 | mm |
| Irradiance | 5.14 | 12.93 | 16.70 | mW/cm$^2$ |

TABLE I-continued

| | Red | Green | Blue | (Units) |
|---|---|---|---|---|
| Total Illumination Area | 2.42 | 2.42 | 5.44 | cm$^2$ |
| Total Optical Power | 35.53 | 89.38 | 259.73 | mW |
| Total Electric Power | 592.16 | 1418.69 | 2854.23 | mW |
| Minimum # of diodes | 12 | 30 | 52 | |
| Linear Diode Density | 0.96 | 2.4 | 4.16 | diode/in |
| Total Bar Power | 4.87 | | | Watts |

Figure 5:
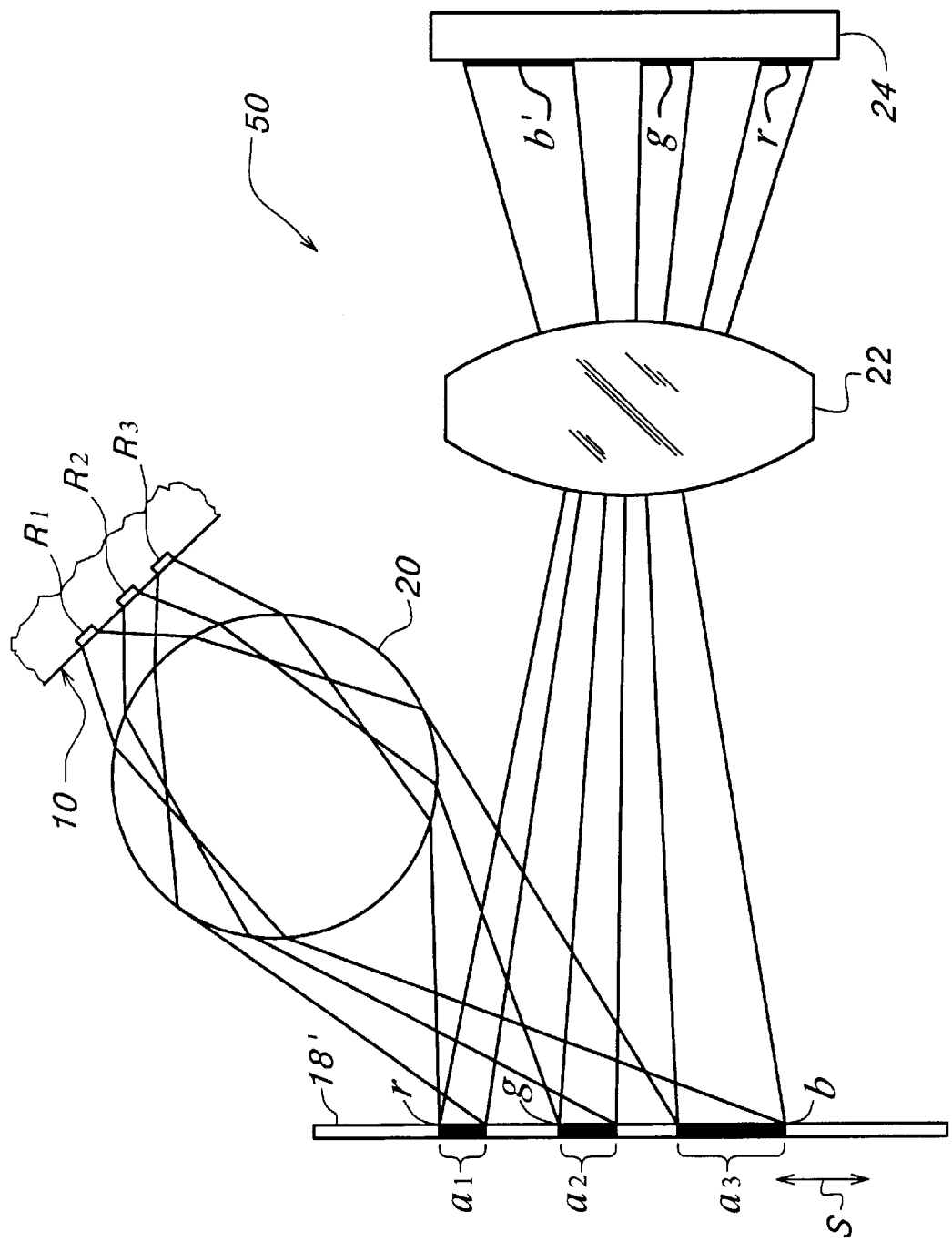
FIG. 5 is a schematic view of a color image sensor apparatus incorporating the first embodiment of the illuminator apparatus.
Figure 6:
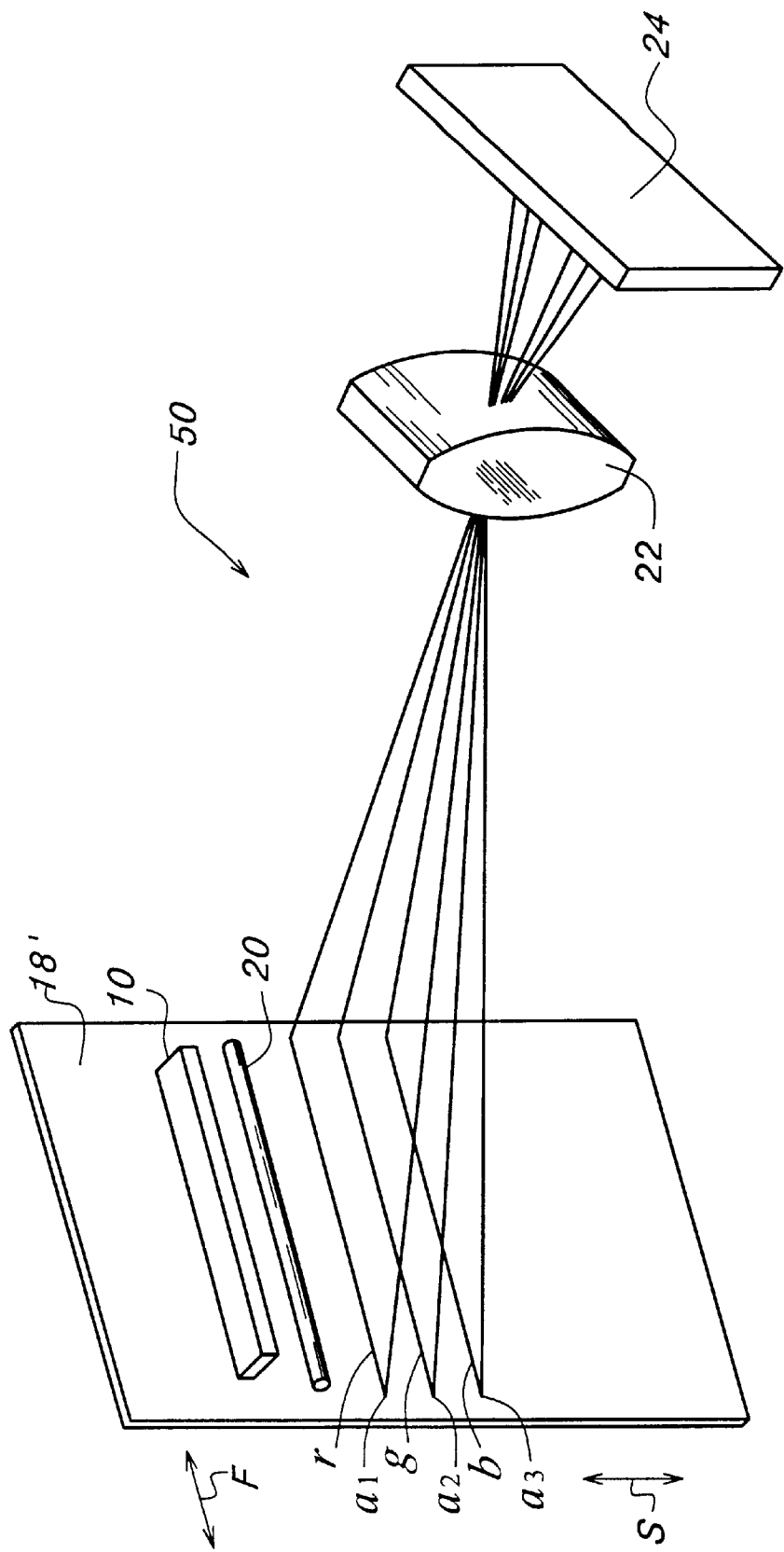
FIG. 6 is a perspective view of the color image scanner apparatus of FIG. 5.

A color image sensor apparatus 50 is schematically illustrated in FIGS. 5 and 6. The color image sensor apparatus 50 usable with a scanner device which is capable of scanning a multi-colored document 18'. The color image sensor apparatus 50 includes the illuminator apparatus 10, the rod lens 20, the convex lens 22 and the light-sensitive detector 24. As discussed above, the illuminator apparatus 10 has three rows of light emitting elements, with each row including a plurality of differently-colored light emitting elements. The illuminator apparatus 10 projects blue colored light, green colored light and red colored light onto the multi-colored document 18'. The blue, green and red colored lights extend across the multi-colored document 18' in the fast scanning direction F as lines, as best shown in FIG. 6.

The rod (or intermediate) lens 20 is positioned between the illuminator apparatus 10 and the multi-colored document 18' and relays the blue, green and red colored lines of light projected from the illuminator apparatus 10 onto the multi-colored document 18'. These blue, green and red lines are labeled b, g and r, respectively. The convex lens 22 receives the blue, green and red lines of light reflected from the multi-colored document 18' and focuses the reflected lines onto the light-sensitive detector 24. The light-sensitive detector 24 receives the focused blue, green and red colored rows of light labeled as b', g' and r', respectively. The focused blue, green and red colored lines of light b', g' and r' are then converted by the light-sensitive detector 24 into respective electrical signals. The light-sensitive detector 24 can be one of many different types. For example, a trilinear color line scan sensor such as the one used in the Dalsa CL-G1-2098G color line scan camera could be used. This camera is described on pages 197 to 206 in 1994 Dalsa Inc. Databook published by Dalsa Inc. of Waterloo, Ontario, Canada. In such a sensing device, the rows of red, green and blue sensors are separated by 112 microns, and the spacing of the color separated illumination on the document would be increased by an amount determined by the demagnification of the imaging system.

The light-sensitive detector more typically would be one in which there is a greater separation between the rows of red, green and blue sensors. This occurs naturally in the case of a conventional trilinear time delay and integration (TDI) image sensors. Because the TDI image sensors use multiple stages for each color channel, the image sensing surfaces for each color channel are wider than for line scan sensors. TDI image sensors are therefore able to sense light originating from a correspondingly wider portion of document surface in the slow scan direction.

FIG. 5 shows the illuminator apparatus 10 illuminating the multi-colored document 18' while being scanned in the scanning device. The illuminator apparatus 10 projects the red line of colored light onto and along a first region $a_1$ of the colored document 18' in the fast scanning direction F, as shown in FIG. 6. The illuminator apparatus 10 also projects the green line of colored light onto and along a second region $a_2$ of the colored document 18' in the fast scanning direction. Further, the illuminator apparatus 10 projects the blue line of colored light onto and along a third region $a_3$ of the colored document 18' in the fast scanning direction. The first, second and third regions $a_1$, $a_2$ and $a_3$ are different from one another and are spaced apart from, but are in close proximity to, one another in the slow scanning direction S, as shown in FIGS. 5 and 6. The first, second and third regions a, $a_2$ and $a_3$ are illuminated by three lines of differently-colored light. This arrangement allows more efficient color illumination of the document, which, in turn, can result in faster scanning, if desired.

Figure 7:
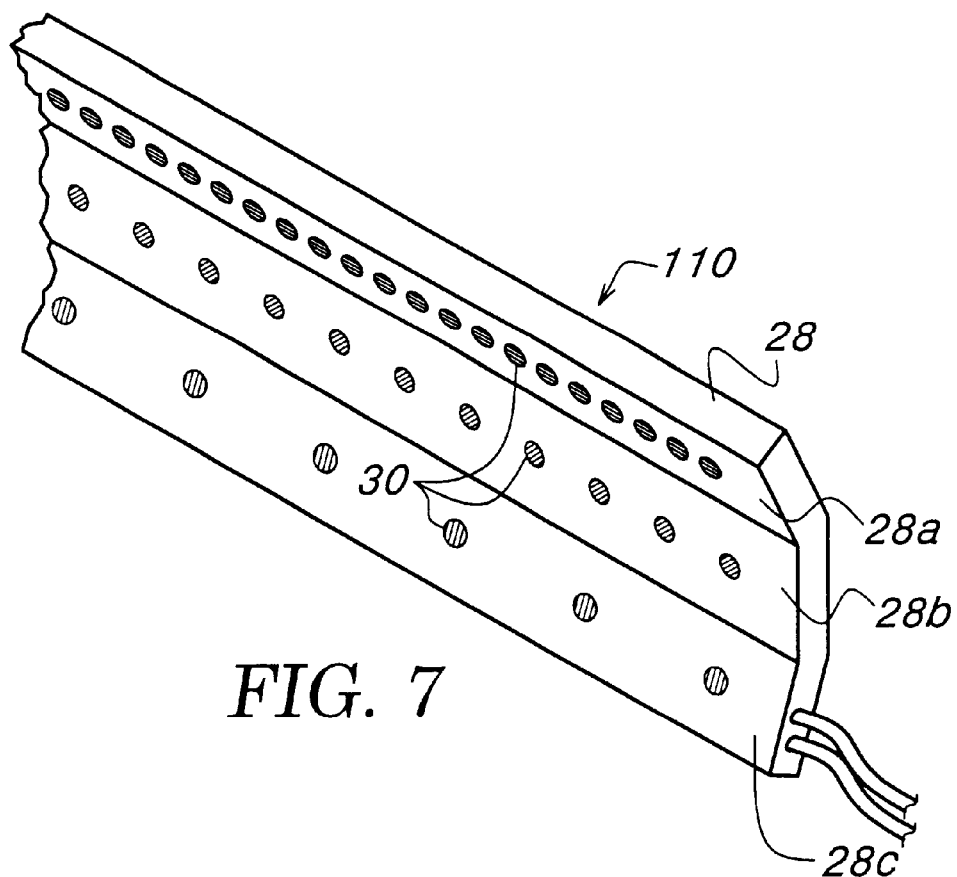
FIG. 7 is a partial perspective view of a second embodiment of the illuminator apparatus of this invention.
Figure 8:
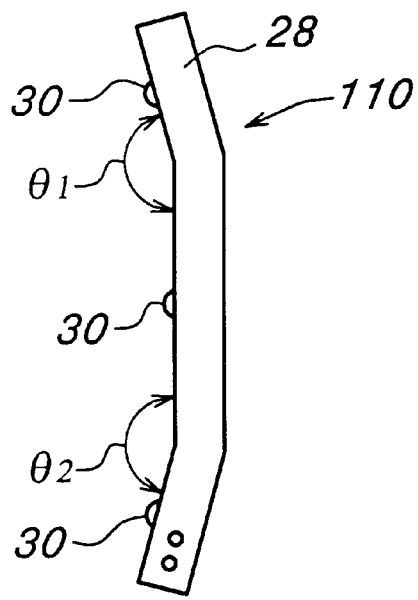
FIG. 8 is a side elevational view of the second embodiment of the illuminator apparatus.

FIGS. 7 and 8 show a second embodiment of the illuminator apparatus 110. In the second embodiment of the illuminator apparatus 110, the support structure 28 includes a first support panel member 28a, a second support panel member 28b and a third support panel member 28c. The first support panel member 28a and the second support panel member 28b are connected to each other to form a first obtuse angle $\theta_1$ relative to each other and the second support panel member 28b and a third support panel member 28c are connected to each to form a second obtuse angle $\theta_2$ relative to each other. The first, second and third support panel members 28a–28c are connected in this manner to form a concavity C, as shown in FIG. 8. A respective one of each of the three rows of the plurality of light emitting elements 30 is supported by a respective one of the first, second and third support panel members 28a, 28b and 28c. Although it is not so limited, the first support panel member 28a supports a row of blue colored light emitting elements 30, the second support panel member 28b supports a row of green colored light emitting elements 30 and the third support panel member 28c supports a row of red colored light emitting elements 30.

Based on the foregoing, one of ordinary skill in the art should appreciate that the illuminator apparatus of this invention is capable of simultaneously projecting spatially separated blue, green and red colored lines of light onto a multi-colored document for a multi-colored scanning process. This allows efficient, high speed, single pass scanning of multi-colored documents. Furthermore, costly colored filters that are presently used in the conventional color scanners may be avoided.

This invention has been described with particularity in connection with specific embodiments. It should be appreciated, however, that other changes can be made to the disclosed embodiment without departing from the inventive concepts and spirit of the invention as defined by the following claims.

What is claimed is:

1. An illuminator apparatus for a scanner device, comprising:
   a support structure extending along a longitudinal axis; and
   an array of light emitting elements disposed on and supported by the support structure, the array of light emitting elements arranged on the support structure in a plurality of longitudinally extending rows disposed apart from each other at predetermined distances in a direction extending perpendicularly to the longitudinal axis, each row including a plurality of the light emitting elements having one of a plurality of different colors;
   wherein each longitudinally extending row projects light of said one of a plurality of different colors on a respective region of a document to be illuminated and each respective region is different and spaced from other regions illuminated by the other longitudinally extending rows.

2. The illuminator apparatus according to claim 1, wherein the plurality of rows is at least three rows.

3. The illuminator apparatus according to claim 1, wherein respective ones of the plurality of rows of light emitting elements are colored at least blue, green and red.

4. The illuminator apparatus according to claim 3, wherein the plurality of rows of light emitting elements extend substantially parallel to each other.

5. The illuminator apparatus according to claim 1, wherein the array of light emitting elements includes three substantially parallel rows of light emitting elements, each row of light emitting elements being differently colored.

6. The illuminator apparatus according to claim 5, wherein an intermediate row of the three rows of light emitting elements has green colored light emitting elements.

7. The illuminator apparatus according to claim 6, wherein the array of light emitting elements includes a first outer row of blue colored light emitting elements and a second outer row of red colored light emitting elements, the intermediate row of green colored light emitting elements disposed between the first outer row of the blue colored light emitting elements and the second outer row of red colored light emitting elements.

8. The illuminator apparatus according to claim 7, wherein the first outer row of blue colored light emitting elements is disposed apart from the intermediate row of green colored light emitting elements at a first lateral distance and the second outer row of red colored light emitting elements is disposed apart from the intermediate row of green colored light emitting elements at a second lateral distance.

9. The illuminator apparatus according to claim 8, wherein the first lateral distance is less than the second lateral distance.

10. The illuminator apparatus according to claim 7, wherein adjacent blue ones of the blue colored light emitting elements are spaced apart from one another at a first distance, adjacent green ones of the green colored light emitting elements are spaced apart from one another at a second distance, and adjacent red ones of the red colored light emitting elements are spaced apart from one another at a third distance.

11. The illuminator apparatus according to claim 10, wherein the third distance is greater than the second distance and the second distance is greater than the first distance.

12. The illuminator apparatus according to claim 1, wherein the support structure comprises a first support panel member, a second support panel member and a third support panel member, the first support panel member and the second support panel member connected to each other to form a first obtuse angle relative to each other and the second support panel member and the third support panel member connected to each other to form a second obtuse angle relative to each other, the first, second and third support panel members forming a concavity, a respective one of each of the plurality of rows of the plurality of light emitting elements is supported by a respective one of the first, second and third support panel members.

13. The illuminator apparatus according to claim 12, wherein the second support panel member supports a row of green colored light emitting elements.

14. The illuminator apparatus according to claim 13, wherein the first support panel member supports a row of blue colored light emitting elements and the third support panel member supports a row of red colored light emitting elements.

15. The illuminator apparatus according to claim 1, wherein each of the plurality of light emitting elements is a light emitting diode.

16. A color image sensor apparatus for a scanner device capable of scanning a multi-colored document, the color image sensor apparatus comprising:

an illuminator having plural rows of light emitting elements, each row including a plurality of light emitting elements, each row being formed by light emitting elements having one of a plurality of different colors, the rows being disposed apart from each other at predetermined distances, the illuminator projecting the differently colored light onto the multi-colored document in respective spaced rows across the multi-colored document in a fast scanning direction;

a lens for receiving and relaying the differently colored spaced rows of light reflected from the multi-colored document; and a light sensitive detector for receiving the relayed differently colored spaced rows of light from the lens and converting the focused differently colored rows of light into respective electrical signals.

17. A color image sensor apparatus according to claim 16, further comprising an intermediate lens disposed between the illuminator and the multi-colored document for relaying the projected blue, green and red colored rows of light from the illuminator onto the multi-colored document.

18. A color image sensor apparatus according to claim 17, wherein the intermediate lens is a rod lens.

19. A color image sensor apparatus according to claim 16, wherein the three rows light emitting elements includes a first row of blue colored light emitting elements, a second row of red colored light emitting elements and a third row of green colored light emitting elements disposed between the first row of the blue colored light emitting elements the second row of red colored light emitting elements.

20. A color image sensor apparatus according to claim 16, wherein the light-sensitive detector is one of a trilinear, time delay and integration charge coupled device and a trilinear line scan charge coupled device.

21. A method of illuminating a colored document being scanned in a scanning device, the method comprising the steps of:

projecting a first line of colored light onto and along a first region of the colored document in a fast scanning direction;

simultaneously projecting a second line of colored light onto and along a second region of the colored document in the fast scanning direction, the second line of colored light being differently colored than the first line of colored light, the second region being different and spaced from the first region; and simultaneously projecting a third line of colored light onto and along a third region of the colored document in the fast scanning direction, the third line of colored light being differently colored than the first and second lines of colored light, the third region being different and spaced from the first and second regions.

22. A method according to claim 21, wherein the first, second and third lines of colored light form three parallel rows of differently colored light extending across the colored document in the fast scanning direction.

23. A method according to claim 22, wherein respective ones of the three parallel rows of differently colored light are spaced apart in close proximity from one another in a slow scanning direction, the slow scanning direction being perpendicular to the fast scanning direction.

24. A method according to claim 21, wherein respective ones of the first, second and third lines of colored light are colored blue, green and red.

* * * * *